(12) United States Patent
Oelofse

(10) Patent No.: US 11,204,016 B1
(45) Date of Patent: Dec. 21, 2021

(54) LIGHT WEIGHT MAST FOR SUPPORTING A WIND TURBINE

(71) Applicant: MAGNELAN ENERGY LLC, Oxnard, CA (US)

(72) Inventor: Rudolph Oelofse, Seattle, WA (US)

( * ) Notice: Subject to any disclaimer, the term of this patent is extended or adjusted under 35 U.S.C. 154(b) by 236 days.

(21) Appl. No.: 16/662,839

(22) Filed: Oct. 24, 2019

Related U.S. Application Data

(60) Provisional application No. 62/749,896, filed on Oct. 24, 2018.

(51) Int. Cl.
*F03D 3/06* (2006.01)
*F03D 3/00* (2006.01)
*F03D 13/20* (2016.01)

(52) U.S. Cl.
CPC .............. *F03D 3/065* (2013.01); *F03D 3/005* (2013.01); *F03D 3/061* (2013.01);
(Continued)

(58) Field of Classification Search
CPC . F03D 3/005; F03D 3/02; F03D 3/061; F03D 13/20; F05B 2240/214
See application file for complete search history.

(56) References Cited

U.S. PATENT DOCUMENTS

| 4,180,372 A | 12/1979 | Lippert, Jr. |
| 4,449,053 A | 5/1984 | Kutcher |

(Continued)

FOREIGN PATENT DOCUMENTS

| WO | 2010048152 A1 | 4/2010 |
| WO | 2011144830 A1 | 11/2011 |

(Continued)

OTHER PUBLICATIONS

True Bridge Composites Inc: "Power Solution Wind Power, Everything in Our World Starts with Energy, Improving Life Through Responsible Technologies," Specification for the TN Vertical Axis Wind Turbine dated Mar. 30, 2012.

(Continued)

*Primary Examiner* — Woody A Lee, Jr.
*Assistant Examiner* — Brian O Peters
(74) *Attorney, Agent, or Firm* — Patterson Intellectual Property Law, P.C.; Gary L. Montle

(57) ABSTRACT

A vertical axis wind turbine is supported by a durable and lightweight composite mast comprising a foam material and a support material, wherein the foam material is either (i) layered within or (ii) distributed among the support material. The foam material may be selected from polyethylene, cross-linked polyethylene, ethafoam, polyester, polyether, ether-like-ester, expanded polystyrene, and/or polyurethane. The support material may be selected from steel, metal, carbon nanotubes, and/or plastics such as polyethylene terephthalate, polyethylene, polyvinyl chloride, polypropylene, polystyrene, polylactic acid, polycarbonate, acrylic, acetal and/or nylon. A mixture ratio between the foam material and the support material may be at least 15:1. The mast may comprise a central core layer of foam and a peripheral layer of the support material. In an embodiment, adjacent layers of the central core layer and the peripheral layers alternate between the core and support materials.

17 Claims, 4 Drawing Sheets

(52) U.S. Cl.
CPC ... *F05B 2240/214* (2013.01); *F05B 2240/301* (2013.01); *F05B 2280/4011* (2013.01); *F05B 2280/6003* (2013.01); *F05B 2280/6012* (2013.01); *F05B 2280/6014* (2013.01)

(56) References Cited

U.S. PATENT DOCUMENTS

| | | | |
|---|---|---|---|
| 6,015,258 A * | 1/2000 | Taylor | F03D 3/061 415/4.4 |
| 6,465,899 B2 | 10/2002 | Roberts | |
| 6,519,780 B2 | 2/2003 | Goodwin | |
| 7,303,369 B2 | 12/2007 | Rowan et al. | |
| 7,329,099 B2 | 2/2008 | Hartman | |
| 7,329,965 B2 | 2/2008 | Roberts et al. | |
| 7,417,334 B2 | 8/2008 | Uchiyama | |
| 7,960,852 B2 | 6/2011 | Cumings et al. | |
| 8,128,337 B2 | 3/2012 | Pezaris | |
| 8,193,657 B2 | 6/2012 | Paluszek et al. | |
| 8,648,483 B2 | 2/2014 | Haar | |
| 10,033,314 B2 | 7/2018 | Oelofse | |
| 2003/0175089 A1 | 9/2003 | Almind | |
| 2007/0253824 A1 | 11/2007 | Eyb | |
| 2009/0016884 A1 | 1/2009 | Fan | |
| 2009/0211173 A1 * | 8/2009 | Willey | B29C 70/865 52/40 |
| 2009/0224552 A1 | 9/2009 | Sulentic | |
| 2010/0071301 A1 | 3/2010 | Herrius de Roest | |
| 2010/0111689 A1 | 5/2010 | Davis | |
| 2010/0140949 A1 | 6/2010 | Pitre et al. | |
| 2010/0295316 A1 | 11/2010 | Grassman | |
| 2011/0183094 A1 | 7/2011 | Blomqvist | |
| 2011/0280708 A1 | 11/2011 | Cochrane | |
| 2012/0141295 A1 | 6/2012 | Martínez De Castañeda et al. | |
| 2013/0017084 A1 | 1/2013 | Anderson | |
| 2013/0115069 A1 | 5/2013 | Zha et al. | |
| 2013/0183164 A1 | 7/2013 | Silvert et al. | |
| 2014/0356180 A1 | 12/2014 | Oelofse | |
| 2017/0022967 A1 | 1/2017 | Hökelek | |
| 2018/0057176 A1 | 3/2018 | Kinlen et al. | |

FOREIGN PATENT DOCUMENTS

| | | |
|---|---|---|
| WO | 2016176352 A1 | 11/2016 |
| WO | 2017014993 A1 | 1/2017 |
| WO | 2017089047 A1 | 6/2017 |

OTHER PUBLICATIONS https://web.archive.org/web/20130723164027/http:/www.revairwind.com/gallery/.

* cited by examiner

LIGHT WEIGHT MAST FOR SUPPORTING A WIND TURBINE

CROSS-REFERENCES TO RELATED APPLICATIONS

This application claims benefit of U.S. Provisional Patent Application No. 62/749,896, filed Oct. 24, 2018, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The field of the invention relates to vertical axis wind turbines, and more particularly to a lightweight mast for supporting vertical axis wind turbines.

BACKGROUND

The following description includes information that may be useful in understanding the present invention. It is not an admission that any of the information provided herein is prior art or relevant to the presently claimed invention, or that any publication specifically or implicitly referenced is prior art.

Modern societies are increasingly dependent upon electricity. One way to produce that energy is to use wind turbines, which convert the wind's kinetic energy into rotary mechanical energy, and then into electricity. Wind turbines are environmentally advantageous because they produce electricity from inexhaustible winds, without also producing carbon dioxide or other pollution.

There are mainly two types of wind turbines, horizontal axis wind turbines (HAWT's) and vertical axis wind turbines (VAWT's). Currently, HAWT's produce the overwhelming majority of wind power. These turbines have the main rotor shaft and a heavy electrical generator at the top of the mast, which are quite heavy. In addition, the blades act as resistance to the wind, all of which require the masts to be quite strong.

VAWT's can have a ground-based generator, but can also optionally be raised on a mast to secure energy from wind elevated wind patterns. Raised VAWT's can also require a strong mast, especially where the turbines operate on a resistance basis rather than an airfoil basis.

The term "mast" as referred to herein may be used as typically understood in the art, such as for example to embody or otherwise include support structures or towers that are substantially vertical in orientation when implemented in or upon the ground to support at least the rotating components of a wind turbine (e.g., the turbine rotor and the plurality of blades coupled thereto). The term "mast" is not necessarily limited to fixed support structures and may comprise the turbine rotor and one or more magnet sets which may typically further be provided between the turbine support and the rotor, thereby reducing and effectively eliminating friction between the rotor and the fixed support during rotation of the blades.

Commonly used materials for masts of any type are steels and other alloys, further including for example polymers. However, these materials tend to be quite heavy, which can be problematic when masts are used in a wind farm comprising large numbers of turbines in as close proximity as is practicable. U.S. Pat. No. 7,329,099 (Hartman) discloses that a resin fiber could be used for making masts with reduced weight. However, Hartman's resins are not cost effective as compared with steels and other alloys.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Briefly stated, there is still an unmet need for strong, lightweight masts.

BRIEF SUMMARY

In accordance with an embodiment of a wind turbine as disclosed herein, which may preferably but not necessarily be a vertical axis wind turbine, a durable and lightweight mast is provided comprising a foam material and a support material. At least one support ring is coupled to the mast and configured to rotate about a vertical axis corresponding to the mast, and further along a plane transverse to the vertical axis. A plurality of airfoil blades is coupled to the support ring to extend from the vertical axis thereby. It is contemplated that the foam material may be either (i) layered within or (ii) distributed among the support material.

In one exemplary aspect of the aforementioned embodiment, the foam material may comprise at least one polyethylene, cross-linked polyethylene, ethafoam, polyester, polyether, ether-like-ester, expanded polystyrene, and polyurethane.

In another exemplary aspect of the aforementioned embodiment, the support material may comprise at least one of steel, metal, carbon nanotubes, and plastics. The plastics may comprise at least one of polyethylene terephthalate, polyethylene, polyvinyl chloride, polypropylene, polystyrene, polylactic acid, polycarbonate, acrylic, acetal and nylon.

In the case where the foam and support materials are mixed together, the mixture can have a wide range of foam to support material volume ratios, including from 1:1 to at least 2:1, more preferably from 1:1 to at least 5:1, more preferably from 1:1 to at least 10:1, and still more preferably from 1:1 to at least 15:1. Accordingly, in another exemplary aspect of the aforementioned embodiment, a mixture ratio between the foam material and the support material may be at least 15:1.

In another exemplary aspect of the aforementioned embodiment, the mast may comprise a central core layer and a plurality of peripheral layers surrounding the central core layer, wherein the central core layer of the mast comprises the support material, and adjacent layers of the central core layer and the plurality of peripheral layers alternate between compositions comprising the foam material and the support material.

The central core layer or region as referred to herein may be defined as the central region of a vertically cross-sectioned mast.

In another exemplary aspect of the aforementioned embodiment, the mast may comprise a central core layer and a plurality of peripheral layers surrounding the central core layer, wherein the central core layer of the mast comprises the foam material, and adjacent layers of the central core layer and the plurality of peripheral layers alternate between compositions comprising the foam material and the support material.

In another exemplary aspect of the aforementioned embodiment, one support ring is coupled at a central portion to a first end of the mast and coupled about a circular periphery to middle portions of each of the plurality of airfoil blades.

In another exemplary aspect of the aforementioned embodiment, the mast is a singular mast structure.

In another exemplary aspect of the aforementioned embodiment, a first support ring is coupled at a central portion to a first end of the mast and coupled about a circular periphery to respective first ends of each of the plurality of airfoil blades, and a second support ring is coupled in parallel with the first support ring and at a central portion to the mast, and further coupled about a circular periphery to respective second ends of each of the plurality of airfoil blades.

In another exemplary aspect of the aforementioned embodiment, each of the airfoil blades comprises an elongated core of a first material having a first density, and a second material encapsulating the elongated core and having a density larger than three times the first density. The elongated core has a first cross-sectional airfoil shape and the second material has a second cross-sectional airfoil shape. The second cross-sectional airfoil shape may have a flat outer face respective to the mast.

In another exemplary aspect of the aforementioned embodiment, the first cross-sectional airfoil shape has a length of $L_1$, the second cross-sectional airfoil shape has a length of $L_2$, and $1.5\ L_1 \leq L_2 \leq 2.5\ L_1$.

In another exemplary aspect of the aforementioned embodiment, the first cross-sectional airfoil shape has a height of $H_1$, the second cross-sectional airfoil shape has a length to height ratio of $H_2$, and $1.5\ H_1 \leq H_2 \leq 2.5\ H_1$.

In another exemplary aspect of the aforementioned embodiment, the first cross-sectional airfoil shape has a height $H_1$ to length $L_1$ ratio between 0.1 and 0.3, inclusive.

In another exemplary aspect of the aforementioned embodiment, the second cross-sectional airfoil shape has a height $H_2$ to length $L_2$ ratio between 0.1 and 0.3, inclusive.

In another exemplary aspect of the aforementioned embodiment, the first cross-sectional airfoil shape has a length of $L_1$, the second cross-sectional airfoil shape has a length of $L_2$, the first cross-sectional airfoil shape has a height of $H_1$, the second cross-sectional airfoil shape has a height of $H_2$. Further, $1.5\ L_1 \leq L_2 \leq 2.5\ L_1$, $1.5\ H_1 \leq H_2 \leq 2.5\ H_1$, $0.5 \leq L_1/H_1 \leq 0.8$, and $0.5 \leq L_2/H_2 \leq 0.8$.

In another exemplary aspect of the aforementioned embodiment, the first material for each of the airfoil blades comprises a foam and the second material for each of the airfoil blades comprises a resin.

In another exemplary aspect of the aforementioned embodiment, the elongated core for each of the airfoil blades has a center comprising a third material having a third density different from the first density or the second density.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
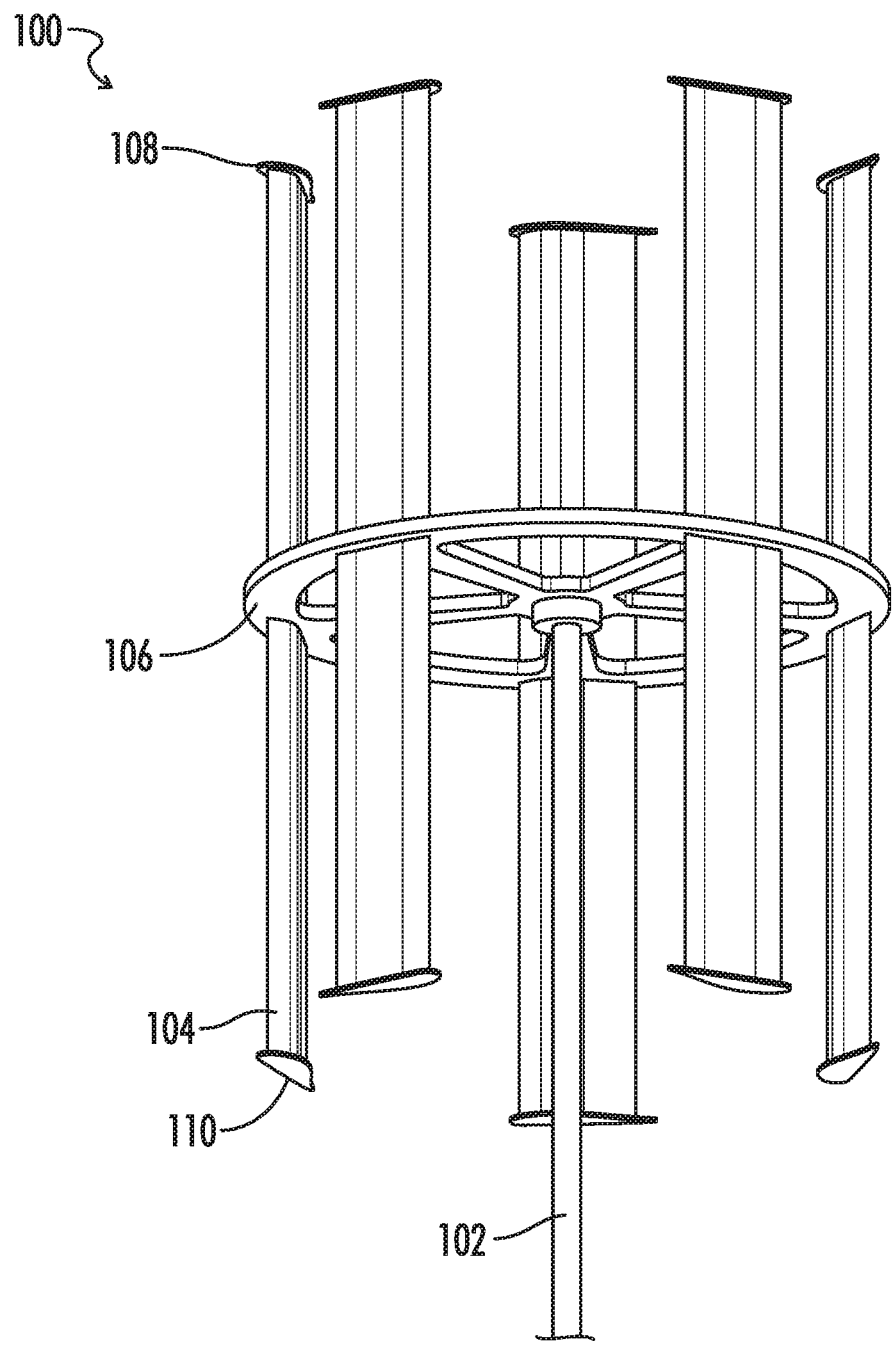
FIG. 1 is a perspective view representing an exemplary embodiment of a vertical axis wind turbine as disclosed herein.

Referring generally to FIGS. 1-8, various exemplary embodiments of an apparatus, systems and methods may now be described in detail for producing a durable and lightweight mast for a wind turbine, especially for a vertical axis wind turbine (VAWT). Where the various figures may describe embodiments sharing various common elements and features with other embodiments, similar elements and features are given the same reference numerals and redundant description thereof may be omitted below.

The following discussion provides many exemplary embodiments of inventive subject matter. Although each embodiment may represent a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

One aspect of the present invention includes a lightweight mast used to provide a stable means of support for wind turbines, especially used for vertical axis vertical turbines (VAWT's). Because the mast is lightweight, it requires less power and cost to build corresponding wind turbines.

In addition, an exemplary lightweight mast as disclosed herein may typically be less damaged during operation as compared with the conventional masts because of a cushioning function against wind blowing onto the respective turbines. Therefore, it is expected to require less maintenance and lower respective costs over time.

Various exemplary embodiments of an inventive mast as disclosed herein may take on any number of shapes, such as for example substantially cylindrical, frustoconical, or the like, and is not limited as such unless otherwise expressly stated. For example, the mast may decrease in cross-sectional diameter along its longitudinal length (continuously or in sections), or may be substantially constant in cross-sectional diameter along its length. Various exemplary embodiments of a mast as disclosed herein may further be singular or integral in structure, or may alternatively be composed of multiple coupled portions having a common vertical axis when assembled, and once again a modular, hybrid, or integral nature of the mast structure is not intended as being limited on the scope of any embodiment as disclosed herein unless otherwise specifically expressed.

FIG. 1 generally depicts a VAWT 100. The VAWT mainly comprises a plurality of (e.g., five) airfoil wind blades 104 disposed about an upper portion of a mast 102. Various exemplary advantages of the VAWT with respect to a horizontal axis wind turbine (HAWT) may include that 1) a corresponding generator (not shown) may be positioned closer to the ground level, such that the mast is called upon to support less weight, 2) the airfoil wind blades are vertically positioned in balance, such that the mast does not need to support imbalanced weight, and 3) the respective airfoil wind blades do not face against wind, such that the mast does not have to be designed to encounter resistance against wind. Otherwise stated, a mast designed specifically for VAWT implementation does not need to be as strong as the equivalent structure for HAWT implementation.

An exemplary airfoil blade 104 for use by a VAWT 100 may be configured to minimize wind shadowing, such that the wind speed against downstream turbines can be almost the same as the upstream turbines. The airfoil blade may generally include an outer layer with an upper skin and a lower skin, and a central core. The central core may in certain embodiments comprise a longitudinal spar along substantially the entire length of the airfoil blade to define an internal skeleton about which is further disposed a core polymer material such as a foam composite.

It may be generally contemplated that airfoil blades 104 as disclosed herein are implemented in VAWT's 100 to facilitate laminar flow throughout the entire 360-degree circumference of the respective VAWT, and further to even improve efficiencies of production with respect to adjacent VAWT's. As incorporated into the VAWT's, each airfoil blade may function with little or no true wind to provide power to the turbine, instead being driven substantially in many contexts by the laminar flow slipstream from a preceding (i.e., leading) airfoil blade in a rotating air drum, which laminar flow is created by the specific geometries of the respective airfoil blades and the wind turbine. The apparent wind created by the foil shape allows for an accelerated laminar flow and maintains the attached boundary layer on the foil. Each airfoil blade may further be sized, shaped and positioned to maintain lift and torque throughout the 360-degree radial without significant air mass cavitation.

It may be appreciated that airfoil blades 104 as disclosed herein can operate in a dimension where the angle of attack of the wind is constantly changing. As previously noted, the airfoil blades do not fly in true linear wind, but rather they may fly in the laminar flow of the created wind (i.e., the apparent wind) of the preceding foil. Maintaining of laminar flow throughout the 360-degree radial allows the foil to maintain lift, which eliminates the need for a stall start up sequence and allows for a very wide window for creating torque energy. The accelerated lift apparent air flow that is developed by the airfoil blades, preferably about the entire circumference of the turbine, can create the torque used by the VAWT 100.

In an exemplary embodiment as illustrated in FIG. 1, a vertical axis wind turbine 100 may have five airfoil blades 104 circumferentially arranged about the mast 102 which supports the five airfoil blades and a middle "ring" portion 106 that connects them thereto. The ring portion extends from the mast to the five airfoil blades along a plane substantially transverse to the vertical axis corresponding to the mast and about which the airfoil blades rotate during operation. In the represented embodiment, the airfoil blades further include flanged or otherwise enlarged portions 108, 110 at both of first and second opposing ends to help reduce drag and stabilize the wind turbine 100, especially for example when rotating at high speeds.

Although an arrangement with five airfoil blades is generally preferred in accordance with demonstrated efficiencies, further for example in view of desired longevity and to consistently produce the stable rotating air drum, vertical axis wind turbines have fewer (e.g., three) or more blades (e.g., ten or twelve) are also contemplated and within the scope of the present disclosure unless otherwise stated.

Figure 2:
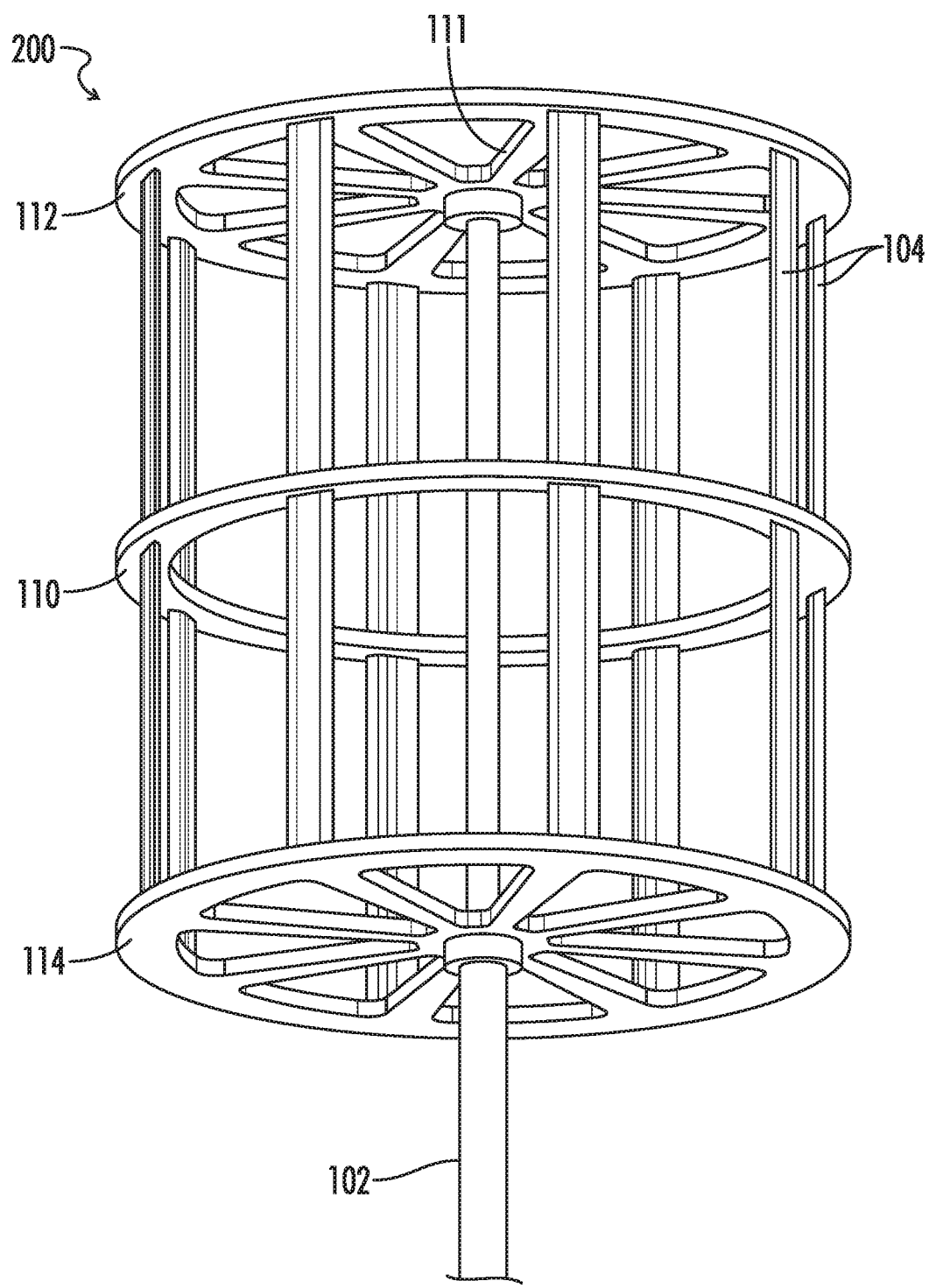
FIG. 2 is a perspective view representing another exemplary embodiment of a vertical axis wind turbine as disclosed herein.

For example, FIG. 2 represents another embodiment of a vertical axis wind turbine 200 having, e.g., eight airfoil blades 104. In this embodiment, all eight blades are connected to each of a top ring 112, a middle ring 110, and a bottom ring 114. The top ring 112 includes one or more support arms 111 radially extending as spokes for connecting an outer rim of the ring to its center extending about and typically engaging the mast 102. The bottom ring as represented in this embodiment has a similar structure to the top ring, but the middle ring may be provided without the aforementioned support arms. It is contemplated that the arrangement of FIG. 2, including three vertically spaced rings coupled to each of the airfoil blades, may be provided for VAWT's having an alternative number of airfoil blades and is in no way limited to the represented eight blade configuration unless otherwise stated or as determined to be optimal, e.g., for performance or efficiency reasons.

Figure 3:
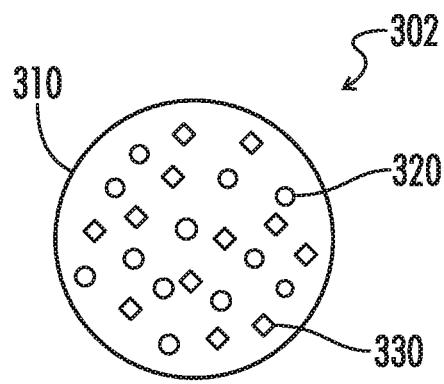
FIG. 3 is a cross-sectional view of an exemplary embodiment of a mast as disclosed herein, in which a foam and a support material are mixed.

FIG. 3 depicts a cross-sectional view of an embodiment of a mast 302 as disclosed herein, wherein the structure 310 is made of a mixture of foam materials 320 and support 330 materials.

Figure 4:
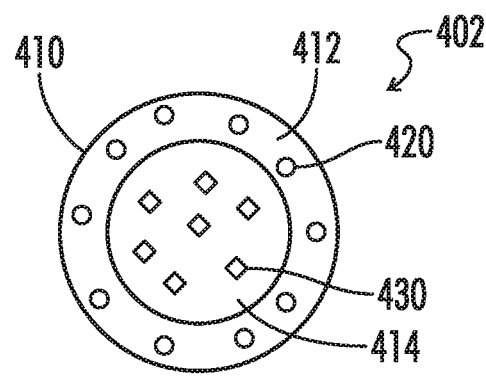
FIG. 4 is a cross-sectional view of an exemplary embodiment of a mast as disclosed herein, in which a foam and a support material are arranged in layers.

FIG. 4 depicts a cross-sectional view of another embodiment of a mast 402 as disclosed herein, wherein the structure 410 comprises a core region 414 surrounded by a peripheral layer 412. When the core region is constructed of the foam material 420, the peripheral layer surrounding the core region may be formed by the support material 430, and vice versa.

Figure 5:
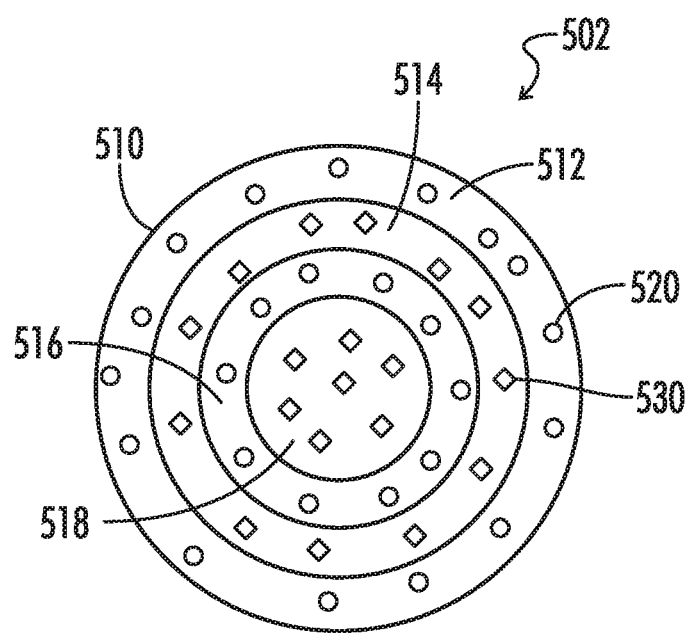
FIG. 5 is a cross-sectional view of an exemplary embodiment of a mast as disclosed herein, in which a foam and a support material are arranged in four layers.

In another embodiment of a mast 502 as disclosed in FIG. 5, the structure 510 may have, e.g., four layers including a core region 518 and three peripheral layers 516, 514, 512, respectively. When the core region is composed of a foam material 520, a first peripheral layer adjacent to and surrounding the core region is composed of a support material 530, and vice versa. It is further contemplated that the layers may be alternatively repeatable through the remaining second and third peripheral layers, etc.

Figure 6:
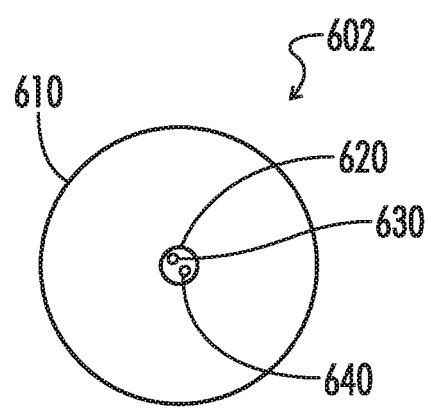
FIG. 6 is a cross-sectional view of an exemplary embodiment of a mast as disclosed herein, having an axially running cavity or channel to receive power and control cords.

In another embodiment of a mast 602 as disclosed in FIG. 6, an axially disposed cavity 620 or channel may be provided within the structure 610, e.g., through the core region to receive power cords 630 and/or control cords 640.

Contemplated masts can be made by either mixing the foam and support materials together, or by layering them. In the first case, the mixture can have a wide range of foam to support material volume ratios, including from 1:1 to at least 2:1, more preferably from 1:1 to at least 5:1, more preferably from 1:1 to at least 10:1, and still more preferably from 1:1 to at least 15:1. Where the materials are arranged in layers, a core region of the mast can be made by either the foam or support material, and an exterior layer may be constructed of the material not used for the core region. The core region herein is defined as the central region of a vertically cross-sectioned mast.

Masts are contemplated that have more than two layers of foam and densities, and support materials also utilizing magnetic bearings to reduce weight and drag.

In an embodiment, the foam material for a mast as disclosed herein can be any one or more of polyethylene, cross-linked polyurethane, ethafoam, polyester, polyether, ether-like-ester, expanded polystyrene, and polyurethane.

The support material in various embodiments may include at least one of steel, metal, and carbon nanotubes and plastics.

The plastics in various embodiments may include at least one of polyethylene terephthalate, polyethylene, polyvinyl chloride, polypropylene, polystyrene, polylactic acid, polycarbonate, acrylic, acetal, and nylon.

In various embodiments, a mast as disclosed herein comprises an inner composite supporting column that has conical magnetic bearings which support the mast along its full length. Male or female bearing components are associated with the fixed inner column, wherein corresponding female or male bearing components are likewise associated with an outer composite rotating column. In one exemplary embodiment, the inner column may comprise a core region of the mast as described above, constructed for example from either a foam material or a support material, whereas the outer column is constructed from the other of the foam material or the support material. In another exemplary embodiment, each of the inner column and the outer column are constructed of multiple layers, wherein each column has a respective interior portion and exterior skin portions. An interior portion may be formed of a combination of the foam and support materials, or alternatively an interior portion may be formed of a foam material or a support material.

In an embodiment, a mast as disclosed herein is constructed using a sandwich construction process incorporating vacuum infusion, whereby associated composite materials may be placed inside, e.g., a cylindrical mold and a silicon and/or plastic film bag may be placed inside the dry composite matrix in such a manner that when the vacuum is introduced the bag will expand. The dry composite matrix is thereby forced against the mold chamber, upon which the bonding resin may be introduced to link with the composite materials until the part is completely infused and ready for service.

Figure 7:
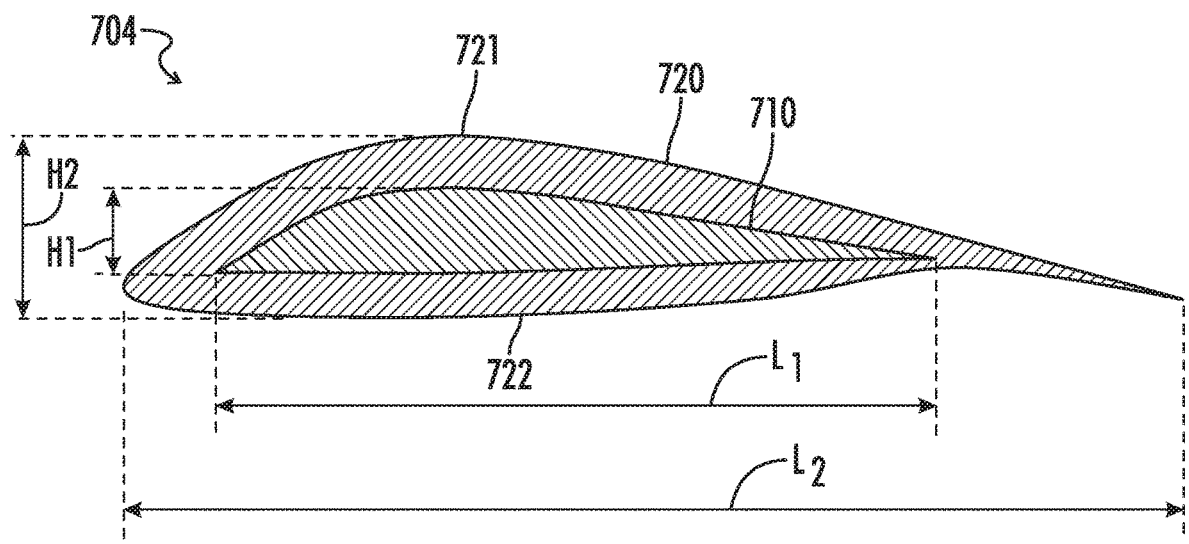
FIG. 7 is a cross-sectional view of an airfoil wind blade from the vertical axis wind turbine of FIG. 1, having a core as disclosed herein.

Referring now to FIG. 7, an embodiment of an airfoil blade 704 for use with a VAWT as disclosed herein may have a cross-sectional streamlined shape in its outer layer 720, generally comprising an elongated and angular trailing edge portion and a more rounded leading-edge portion. The airfoil blade 704 may have a cross-sectional streamlined airfoil shape in its outer layer 720 resembling a bird's wing. For example, the cross-sectional streamlined airfoil shape may include a raised and relatively curved low-pressure portion 721 and a substantially flat high-pressure portion 722.

In an embodiment, airfoil blades 104, 704, 804 as disclosed herein may further be designed for dynamic self-regulation in high winds, wherein each leading foil in a circumferential VAWT arrangement allows the laminar flow to start separating from the high pressure side of the foil. For example, a low pressure hollow having a length and a width may be provided on the trailing edge of the high pressure side of an airfoil blade, causing a boundary layer separation based at least on the aforementioned length and width of the low pressure hollow (with air density as a constant) to cause a smooth airflow. This control of the boundary layer separation and resultant airflow further creates a turbulent buffeted air mass into which a trailing airfoil blade will enter and have its lift reduced or at least retarded, thereby preventing the trailing foil from over-speeding without requiring the implementation of additional braking hardware or electronic control circuitry.

In various embodiments, the cross-sectional airfoil shape of the core material layer 710 of the airfoil blade 704 is substantially similar to the cross-sectional airfoil shape of the exterior layer 720. As used herein, "similar" means geometrically similar, that is, one can be obtained from the other by uniformly scaling (enlarging or reducing), possibly with additional translation, rotation and reflection. Where the blade has an exterior layer and a core material layer with similar streamlined airfoil shapes as represented in FIG. 7, the exterior airfoil shape may have a length L2 and a height H2, and the core airfoil shape may have a length L1 and a height H1. In a preferred embodiment, the core airfoil shape 710 is adapted to have a height to length ratio H1/L1 between 0.1 and 0.3. In a preferred embodiment, the exterior airfoil shape 720 is also adapted to have a height to length ratio H2/L2 between 0.1 and 0.3.

In a preferred embodiment, the length L2 of the exterior airfoil shape 720 is between 1.5 and 2.5 times the length L1 of the core airfoil shape 710, and the height H2 of the exterior airfoil shape is between 1.5 and 2.5 times the height H1 of the core airfoil shape. It is determined these ratios are optimal in terms of balancing the relative strength provided by the exterior 720 and the relative light weight provided by the core 710. Airfoil blades 704 of all commercially viable sizes are contemplated, for example, having lengths of between 0.5 to 100 meters.

The exterior layer 720 and the core layer 710 may in various embodiments be made with any suitable material, as long as the core material is relatively light weight as compared to the exterior material, and the exterior material has higher strength and preferably more weather resistant than the core material. In preferred embodiments, the exterior 720 and the core 710 are each made of a polymer. Contemplated polymer used in the core layer includes a foam material, or a honeycomb material. Contemplated polymer used in the exterior layer includes a resin that has high strength and is weather resistant. As used herein, "weather resistant" at least connotes an ability to maintain the desired functionality and structural integrity in extreme heat, cold, rain, lightening, acidity, snow, or wind that can be found in any natural environment on earth, for a substantial amount of time (at least several months, but ideally several years). For example, it has been shown that exemplary airfoil blades as disclosed herein can function in blizzard conditions during the Iceland winter, in winds of 40 m/s (approx. 90 mph).

Contemplated resins may include an epoxy resin, a polyimide high-temperature polymer-matrix composite, a bismaleimide high-temperature polymer-matrix composite, an inorganic polymer, a polybenzoxazole, a polybenzoxazine, a polyetheretherketone, or any combinations thereof. It is also contemplated that the exterior 720 can be made of one or more composite materials (e.g., composite fiber resin infused, hybrid epoxy vinyl ester resins and biaxial or triaxial composite materials laminated to high performance cores, etc.). It should be appreciated that a composite material is any material made from two or more constituent materials with significantly different physical or chemical properties (e.g., fiber and resin), that when combined, produce a material with characteristics significantly different from any of the individual components.

It is contemplated in various embodiments that the density of the exterior material 720 is at least three times greater than the density of the core material 710 of an exemplary airfoil blade as disclosed herein.

It is also contemplated that the materials used in various embodiments of the core layer 710 and/or the exterior layer 720 of an exemplary airfoil blade 704 as disclosed herein may be recyclable.

Figure 8:
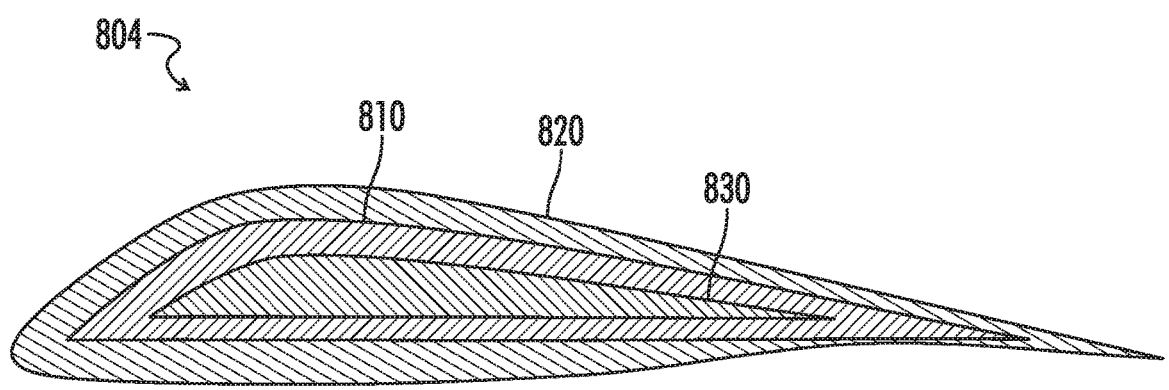
FIG. 8 is a cross-sectional view of another embodiment of the airfoil wind blade of FIG. 1, the core having a center made of a different material.

Referring next to FIG. 8, an embodiment of an airfoil blade 804 as disclosed herein may have a cross-sectional streamlined exterior airfoil shape 820 and a cross-sectional core shape 810, while further having a central portion 830 within or otherwise enveloped by the cross-sectional core shape and comprising yet another material having a different density. The central portion may be hollow in some embodiments to further reduce the weight of the blade and to save material. Preferably, the cross-sectional shape of the central portion is substantially symmetrical with respect to the shape of the exterior surface 820, which is itself further substantially symmetrical to the core shape 810. However, it may be contemplated that the central portion may be designed to have alternative shapes, for example, a round shape, an oval, or a square, etc.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification refers to at least one of something selected from the group consisting of A, B, C . . . and N, the text should be interpreted as requiring only one element from the group, not A plus N, or B plus N, etc.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A vertical axis wind turbine, comprising:
a mast comprising a foam material and a support material;
at least one support ring coupled to the mast and configured to rotate about a vertical axis corresponding to the mast, and further along a plane transverse to the vertical axis; and
a plurality of airfoil blades coupled to the support ring and extended from the vertical axis thereby,
wherein the foam material is either (i) layered within or (ii) distributed among the support material;
wherein the mast comprises a central core layer and a plurality of peripheral layers surrounding the central core layer; and
wherein the central core layer of the mast and at least one peripheral layer comprises the support material, and adjacent layers of the central core layer and the plurality of peripheral layers alternate between compositions comprising the foam material and the support material.

2. The vertical axis wind turbine of claim 1, wherein the foam material comprises at least one of the group consisting of polyethylene, cross-linked polyethylene, ethafoam, polyester, polyether, ether-like-ester, expanded polystyrene, and polyurethane.

3. The vertical axis wind turbine of claim 1, wherein the support material comprises at least one of the group consisting of steel, metal, carbon nanotubes, and plastics.

4. The vertical axis wind turbine of claim 3, wherein the plastics comprises at least one of the group consisting of polyethylene terephthalate, polyethylene, polyvinyl chloride, polypropylene, polystyrene, polylactic acid, polycarbonate, acrylic, acetal and nylon.

5. The vertical axis wind turbine of claim 1, wherein a mixture ratio between the foam material and the support material is at least 15:1.

6. The vertical axis wind turbine of claim 1, comprising one support ring coupled at a central portion to a first end of the mast and coupled about a circular periphery to middle portions of each of the plurality of airfoil blades.

7. The vertical axis wind turbine of claim 1, wherein the mast is a singular mast structure.

8. The vertical axis wind turbine of claim 1, comprising:
a first support ring coupled at a central portion to a first end of the mast and coupled about a circular periphery to respective first ends of each of the plurality of airfoil blades, and
a second support ring coupled in parallel with the first support ring and at a central portion to the mast, and further coupled about a circular periphery to respective second ends of each of the plurality of airfoil blades.

9. The vertical axis wind turbine of claim 1, wherein each of the airfoil blades comprises:
an elongated core comprising a first material having a first density;
a second material encapsulating the elongated core and having a density larger than three times the first density; and
wherein the elongated core has a first cross-sectional airfoil shape and the second material has a second cross-sectional airfoil shape.

10. The vertical axis wind turbine of claim 9, wherein the second cross-sectional airfoil shape has a flat outer face respective to the mast.

11. The vertical axis wind turbine of claim 9, wherein:
the first cross-sectional airfoil shape has a length of $L_1$,
the second cross-sectional airfoil shape has a length of $L_2$, and
$1.5\ L_1 \leq L_2 \leq 2.5\ L_1$.

12. The vertical axis wind turbine of claim 9, wherein:
the first cross-sectional airfoil shape has a height of $H_1$,
the second cross-sectional airfoil shape has a length to height ratio of $H_2$, and
$1.5\ H_1 \leq H_2 \leq 2.5\ H_1$.

13. The vertical axis wind turbine of claim 9, wherein the first cross-sectional airfoil shape has a height $H_1$ to length $L_1$ ratio between 0.1 and 0.3, inclusive.

14. The vertical axis wind turbine of claim 9, wherein the second cross-sectional airfoil shape has a height $H_2$ to length $L_2$ ratio between 0.1 and 0.3, inclusive.

15. The vertical axis wind turbine of claim 9, wherein:
the first cross-sectional airfoil shape has a length of $L_1$,
the second cross-sectional airfoil shape has a length of $L_2$,
the first cross-sectional airfoil shape has a height of $H_1$,
the second cross-sectional airfoil shape has a height of $H_2$, and
wherein $1.5\ L_1 \leq L_2 \leq 2.5\ L_1$, $1.5\ H_1 \leq H_2 \leq 2.5\ H_1$, $0.5 \leq L_1/H_1 \leq 0.8$, and $0.5 \leq L_2/H_2 \leq 0.8$.

16. The vertical axis wind turbine of claim 9, wherein the first material for each of the airfoil blades comprises a foam and the second material for each of the airfoil blades comprises a resin.

17. The vertical axis wind turbine of claim 9, wherein the elongated core for each of the airfoil blades has a center comprising a third material having a third density different from the first density or the second density.

* * * * *